US008939341B2

(12) United States Patent
Pedicini et al.

(10) Patent No.: US 8,939,341 B2
(45) Date of Patent: Jan. 27, 2015

(54) FASTENER DRIVING APPARATUS

(71) Applicants: Christopher Pedicini, Nashville, TN (US); John Witzigreuter, Canton, GA (US)

(72) Inventors: Christopher Pedicini, Nashville, TN (US); John Witzigreuter, Canton, GA (US)

(73) Assignee: Tricord Solutions, Inc., Nashville, TN (US)

( * ) Notice: Subject to any disclaimer, the term of this patent is extended or adjusted under 35 U.S.C. 154(b) by 0 days.

(21) Appl. No.: 14/286,637

(22) Filed: May 23, 2014

(65) Prior Publication Data

US 2014/0374461 A1 Dec. 25, 2014

Related U.S. Application Data

(63) Continuation-in-part of application No. 13/922,465, filed on Jun. 20, 2013, now Pat. No. 8,733,610.

(60) Provisional application No. 61/914,230, filed on Dec. 10, 2013.

(51) Int. Cl.

| | |
|---|---|
| ***B21J 15/28*** | (2006.01) |
| ***B27F 7/17*** | (2006.01) |
| ***B25C 1/04*** | (2006.01) |
| ***B25C 5/02*** | (2006.01) |
| ***B25C 5/06*** | (2006.01) |
| ***B23Q 5/00*** | (2006.01) |
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |

(52) U.S. Cl.
USPC .................... 227/130; 227/8; 173/6; 173/201

(58) Field of Classification Search
CPC ......... B25D 17/06; B25D 11/125; B25C 1/04
USPC .............. 227/30–131, 2, 7–8; 173/1–11, 114, 173/117, 118, 201–204, 121, 212, 176, 132, 173/48, 104, 109, 217
See application file for complete search history.

(56) References Cited

U.S. PATENT DOCUMENTS

| | | | | |
|---|---|---|---|---|
| 4,932,479 | A | 6/1990 | Pyatov | |
| 6,499,643 | B1 | 12/2002 | Hewitt | |
| 6,755,336 | B2 | 6/2004 | Harper et al. | |
| 7,793,811 | B1 | 9/2010 | Pedicini et al. | |
| 8,079,504 | B1 | 12/2011 | Pedicini et al. | |
| 8,534,377 | B2 * | 9/2013 | Berger et al. | 173/204 |
| 2012/0318553 | A1 * | 12/2012 | Chen et al. | 173/198 |
| 2014/0054350 | A1 * | 2/2014 | Pedicini | 227/8 |

* cited by examiner

*Primary Examiner* — Robert Long
(74) *Attorney, Agent, or Firm* — Aldenbaum Schloff and Bloom PLLC; Jay Schloff; Keith Schonberger

(57) ABSTRACT

A fastener driving apparatus includes a vacuum piston and a drive piston, which vacuum piston, when moved (by way of a motor and linear motion converter), draws a vacuum against the drive piston, which drive piston may be held in place by retention means. An anvil is coupled to the drive piston. The retention means is released electrically or mechanically at or near the point of maximum vacuum volume. This drive piston and anvil assembly is then driven by atmospheric pressure and may strike a fastener to drive it into a substrate. At least one position sensor may be used. Once the fastener is driven, the apparatus may reset to an initial position. At least one parasitic loss seal may be provided to reduce drag force on the drive piston, and a timed dwell may be provided for the vacuum piston for operation.

20 Claims, 9 Drawing Sheets

FASTENER DRIVING APPARATUS

CROSS-REFERENCE TO RELATED APPLICATIONS

The present disclosure is a continuation-in-part of pending U.S. Non-provisional patent application Ser. No. 13/922,465, filed on Jun. 20, 2013 and also claims priority under 35 U.S.C. §119 on U.S. Provisional Application Ser. No. 61/914,230, filed on Dec. 10, 2013, the disclosures of which are incorporated by reference.

FIELD OF THE DISCLOSURE

The present disclosure relates to fastener driving apparatuses, and, more particularly, to such fastener or staple driving mechanisms that require operation as a hand tool.

BACKGROUND

Electromechanical fastener driving apparatuses (also referred to herein as a "driver," "gun" or "device") known in the art often weigh generally less than 15 pounds and may be configured for an entirely portable operation. Contractors and homeowners commonly use power-assisted devices and means of driving fasteners into wood. These power-assisted means of driving fasteners can be either in the form of finishing fastener systems used in baseboards or crown molding in house and household projects, or in the form of common fastener systems that are used to make walls or hang sheathing onto same. These systems can be portable (i.e., not connected or tethered to an air compressor or wall outlet) or non-portable.

The most common fastener driving apparatus uses a source of compressed air to actuate a cylinder to push a fastener into a substrate. For applications in which portability is not required, this is a very functional system and allows rapid delivery of fasteners for quick assembly. A disadvantage is that it does however require that the user purchase an air compressor and associated air-lines in order to use this system. A further disadvantage is the inconvenience of the device being tethered (through an air hose) to an air compressor.

To solve this problem, several types of portable fastener drivers operate off of fuel cells. Typically, these guns have a cylinder in which a fuel is introduced along with oxygen from the air. The subsequent mixture is ignited with the resulting expansion of gases pushing the cylinder and thus driving the fastener into the workpieces. This design is complicated and is far more expensive then a standard pneumatic fastener gun. Both electricity and fuel are required as the spark source derives its energy typically from batteries. The chambering of an explosive mixture of fuel, the use of consumable fuel cartridges, the loud report and the release of combustion products are all disadvantages of this solution. Systems such as these are already in existence and are sold commercially to contractors under the Paslode™ name.

Another commercially available solution is a fastener gun that uses electrical energy to drive a stapler or wire brad. Such units typically use a solenoid to drive the fastener (such as those commercially available under the Arrow™ name or those which use a ratcheting spring system such as the Ryobi™ electric stapler). These units are limited to short fasteners (typically 1" or less), are subject to high reactionary forces on the user and are limited in their repetition rate. The high reactionary force is a consequence of the comparatively long time it takes to drive the fastener into the substrate. Additionally, because of the use of mechanical springs or solenoids, the ability to drive longer fasteners or larger fasteners is severely restricted, thus relegating these devices to a limited range of applications. A further disadvantage of the solenoid driven units is they often must be plugged into the wall in order to have enough voltage to create the force needed to drive even short fasteners.

A final commercially available solution is to use a flywheel mechanism and clutch the flywheel to an anvil that drives the fastener. Examples of such tools can be found under the Dewalt™ name. This tool is capable of driving the fasteners very quickly and in the longer sizes. The primary drawback to such a tool is the large weight and size as compared to the pneumatic counterpart. Additionally, the drive mechanism is very complicated, which gives a high retail cost in comparison to the pneumatic fastener gun.

Clearly based on the above efforts, a need exists to provide portable solution to driving fasteners which is unencumbered by fuel cells or air hoses. Additionally, the solution ought to provide a low reactionary feel, be able to drive full size fasteners and be simple, cost effective and robust in operation.

The prior art teaches several additional ways of driving a fastener or staple. The first technique is based on a multiple impact design. In this design, a motor or other power source is connected to an impact anvil through either a lost motion coupling or other device. This allows the power source to make multiple impacts on the fastener to drive it into the workpiece. The disadvantages in this design include increased operator fatigue since the actuation technique is a series of blows rather than a single drive motion. A further disadvantage is that this technique requires the use of an energy absorbing mechanism once the fastener is seated. This is needed to prevent the anvil from causing excessive damage to the substrate as it seats the fastener. Additionally, the multiple impact designs are not very efficient because of the constant motion reversal and the limited operator production speed.

A second design that is taught in U.S. Pat. Nos. 3,589,588, 5,503,319, and 3,172,121 includes the use of potential energy storage mechanisms (in the form of a mechanical spring). In these designs, the spring is cocked (or activated) through an electric motor. Once the spring is sufficiently compressed, the energy is released from the spring into the anvil (or fastener driving piece), thus pushing the fastener into the substrate. Several drawbacks exist to this design. These include the need for a complex system of compressing and controlling the spring, and in order to store sufficient energy, the spring must be very heavy and bulky. Additionally, the spring suffers from fatigue, which gives the tool a very short life. Finally, metal springs must move a significant amount of mass in order to decompress, and the result is that these low-speed fastener drivers result in a high reactionary force on the user.

To improve upon this design, an air spring has been used to replace the mechanical spring. U.S. Pat. No. 4,215,808 teaches of compressing air within a cylinder and then releasing the compressed air by use of a gear drive. This patent overcomes some of the problems associated with the mechanical spring driven fasteners described above, but is subject to other limitations. One particular troublesome issue with this design is the safety hazard in the event that the anvil jams on the downward stroke. If the fastener jams or buckles within the feeder and the operator tries to clear the jam, he is subject to the full force of the anvil, since the anvil is predisposed to the down position in all of these types of devices. A further disadvantage presented is that the fastener must be fed once the anvil clears the fastener on the backward stroke. The amount of time to feed the fastener is limited and can result in jams and poor operation, especially with longer fasteners. A further disadvantage to the air spring results from the need to have the ratcheting mechanism as part of the anvil drive. This mechanism adds weight and causes significant problems in controlling the fastener drive since the weight must be stopped at the end of the stroke. This added mass slows the fastener drive stroke and increases the reactionary force on the operator. Additionally, because significant kinetic energy is contained within the air spring and piston assembly the unit suffers from poor efficiency. This design is further subject to a complicated drive system for coupling and uncoupling the air spring and ratchet from the drive train which increases the production cost and reduces the system reliability.

U.S. Pat. No. 5,720,423 again teaches of an air spring that is compressed and then released to drive the fastener. The drive or compression mechanism used in this device is limited in stroke and thus is limited in the amount of energy which can be stored into the air stream. In order to provide sufficient energy in the air stream to achieve good performance, this patent teaches use of a gas supply which preloads the cylinder at a pressure higher than atmospheric pressure. Furthermore, the compression mechanism is bulky and complicated. In addition, the timing of the motor is complicated by the small amount of time between the release of the piston and anvil assembly from the drive mechanism and its subsequent re-engagement. Additionally, U.S. Pat. No. 5,720,423 teaches that the anvil begins in the retracted position, which further complicates and increases the size of the drive mechanism. Furthermore, because of the method of activation, these types of mechanisms as described in U.S. Pat. Nos. 5,720,423 and 4,215,808 must compress the air to full energy and then release off the tip of the gear while under full load. This method of compression and release causes severe mechanism wear.

A third means for driving a fastener that is taught includes the use of flywheels as energy storage means. The flywheels are used to launch a hammering anvil that impacts the fastener. This design is described in detail in U.S. Pat. Nos. 4,042,036, 5,511,715, and 5,320,270. One major drawback to this design is the problem of coupling the flywheel to the driving anvil. This prior art teaches the use of a friction clutching mechanism that is both complicated, heavy and subject to wear. Further limiting this approach is the difficulty in controlling the energy in the fastener system. The mechanism requires enough energy to drive the fastener, but retains significant energy in the flywheel after the drive is complete. This further increases the design complexity and size of such prior art devices.

A fourth means for driving a fastener is taught in the present inventors' U.S. Pat. No. 8,079,504, which uses a compression on demand system with a magnetic detent. This system overcomes many of the advantages of the previous systems but still has its own set of disadvantages which include the need to retain a very high pressure for a short period of time. This pressure and subsequent force necessitate the use of high strength components and more expensive batteries and motors.

All of the currently available devices suffer from one or more the following disadvantages:

- Complex, expensive and unreliable designs. Fuel powered mechanisms such as Paslode™ achieve portability but require consumable fuels and are expensive. Rotating flywheel designs such as Dewalt™ have complicated coupling or clutching mechanisms based on frictional means. This adds to their expense.
- Poor ergonomics. The fuel powered mechanisms have loud combustion reports and combustion fines. The multiple impact devices are fatiguing and are noisy.

- Non-portability. Traditional fastener guns are tethered to a fixed compressor and thus must maintain a separate supply line.
- High reaction force and short life. Mechanical spring driven mechanisms have high tool reaction forces because of their long fastener drive times. Additionally, the springs are not rated for these types of duty cycles leading to premature failure. Furthermore, consumers are unhappy with their inability seat longer fasteners or work with denser wood species.
- Safety issues. The "air spring" and heavy spring driven designs suffer from safety issues for longer fasteners since the predisposition of the anvil is towards the substrate. During jam clearing, this can cause the anvil to strike the operators hand.
- The return mechanisms in most of these devices involve taking some of the drive energy. Either there is a bungee or spring return of the driving anvil assembly or there is a vacuum or air pressure spring formed during the movement of the anvil. All of these mechanisms take energy away from the drive stroke and decrease efficiency.

In light of these various disadvantages, there exists the need for a fastener driving apparatus that overcomes these various disadvantages of the prior art, while still retaining the benefits of the prior art.

SUMMARY OF THE INVENTION

In accordance with the present invention, a fastener driving apparatus is described which derives its power from an electrical source, preferably rechargeable batteries, and uses a motor to transfer energy through a single stroke linear vacuum generator that creates a vacuum in a single linear stroke. The vacuum acts on a drive piston, which piston is detained by a retention device until a sufficient volume of vacuum is created. An anvil is connected to the drive piston. Once the vacuum created is sufficient for driving the fastener, the retention mechanism can release, allowing the driving piston and anvil to drive the fastener. The vacuum generator (or vacuum piston) is then preferably returned to its start position and the drive piston is likewise returned to its starting position. By using a vacuum rather than pressure, the inventors unexpectedly increased the efficiency of the electro-pneumatic system by more than 50% as measured by energy consumed per fastener driven.

The fastener driving cycle of the apparatus disclosed herein may start with an electrical signal, after which a circuit connects a motor to the electrical power source. The motor is coupled to a linear motion converter, preferably through a speed reduction mechanism. In an embodiment, the speed reduction mechanism is a planetary gearbox. The linear motion converter changes the rotational motion of the motor into linear translating movement of the vacuum piston inside a cylinder. The movement of this vacuum piston begins to create a vacuum in the cylinder or in a chamber (such as a chamber formed by a face of the vacuum piston and either the closed end of a cylinder, or preferably, a face of the driving piston). It will be apparent that the vacuum as it is generated reaches or is at a pressure significantly less than atmospheric and is achieved during at least one point in the operational cycle. Upon creation of a sufficient vacuum volume the drive piston may released from its retention means. (It will be apparent that the drive piston may be released from the retention means through means such as by deactivating the retention means in the case of electrical retention means or through the use of a mechanical element such as a trip or sear lever in the case of mechanical retention means.) The vacuum on the face of the drive piston pulls the drive piston, which drive piston thereafter drives a fastener. The exemplary cycle completes with the vacuum piston substantially returning to its previous position. The drive piston may be predisposed to its initial position via contact with the vacuum piston. By returning the drive piston in this fashion, virtually all of the energy from the single stroke linear vacuum is available to drive the fastener. Additionally, in the event of a jam, the movement of the vacuum piston resets the drive piston and anvil allowing for easy clearing of the jam. Bumpers may be provided to absorb excess energy at the ends of the strokes of the pistons, for example. Control of the system is possible through a very simple circuit that applies and removes power to the motor to complete a cycle.

In an embodiment, the vacuum piston and the drive piston share a common guide structure (hereafter referred to in a non-limiting exemplary embodiment as a cylinder), which configuration simplifies the design as only a single cylinder is needed. Additionally, the movement of the vacuum piston can push the drive piston and anvil back into an initial position.

In an embodiment, the retention means is preferably a combination of at least one magnet and a mechanical release means. The drive piston is preferably released from the retention force as the vacuum piston is at or near the point of maximum vacuum volume, thus allowing the drive piston and anvil to drive the fastener.

In an embodiment, the driver/anvil and piston mass are only a fraction of the tool mass to reduce the recoil felt by the operator and increase the energy delivered to the fastener.

In an embodiment, the drag force on the drive piston is minimized to reduce the parasitic energy loss caused by seal force or friction during the drive cycle.

In an embodiment, a sensor and a control circuit are provided for determining at least one position of the vacuum piston and thus enable the proper timing for stopping the cycle and or releasing an electrically activated detent.

In an embodiment, a mechanical element is used such that as the vacuum piston approaches the point of maximum vacuum volume, the mechanical element releases the drive piston from the retention means.

In an embodiment, a valve may be disposed in at least one of the vacuum piston, the drive piston, or the cylinder to prevent buildup of air in the cylinder or vacuum chamber during use. In a further embodiment, the valve may be disposed in or coupled with one or more seals, for example, which one or more seal may be disposed on the vacuum piston, for example. A U-cup seal that holds air pressure in a single direction would be an example of such a seal.

In another embodiment, a valve may regulate the flow rate of air into the area behind the drive piston and be used to control the drive energy. In a more preferred embodiment the valve is a shutter which can be used to choke off the flow from behind the drive piston and reduce the drive energy.

In another embodiment, the latency (which is defined as the time between the user calling for a fastener to be delivered and the actual delivery of the fastener) is reduced. In a preferred embodiment a clutch can be used to reduce this time. In a more preferred embodiment, some or most of the vacuum might be drawn prior to the request for a fastener, thus reducing the latency time.

In an embodiment the sensor and or a timer may be used to allow time for the drive piston to complete its stroke and/or allow extra time to purge air and air from between the vacuum and drive piston during the up stroke.

Accordingly, and in addition to the objects and advantages of the portable electric fastener gun as described above, several objects and advantages of the present invention are:

To provide a simple design for driving fasteners that has a significantly lower production cost than currently available nail guns and that is portable and does not require an air compressor.

To provide a fastener driving device that mimics the pneumatic fastener performance without a tethered air compressor.

To provide an electrical driven high power fastening device that has very little wear.

To provide an electric motor driven fastener driving device in which energy is not stored behind the fastener driving anvil, thus greatly enhancing tool safety.

To provide a simple apparatus for driving a fastener in which sufficient energy to drive the fastener is created in a single stroke, thus greatly increasing the system efficiency.

To eliminate bungee, vacuum or mechanical spring returns on the drive piston and/or anvil thus increasing energy available to drive the fastener and speed at which the drive takes place.

To provide a more energy efficient mechanism for driving nails than is presently achievable with a compressed air design.

These together with other aspects of the present disclosure, along with the various features of novelty that characterize the present disclosure, are pointed out with particularity in the claims annexed hereto and form a part of the present disclosure. For a better understanding of the present disclosure, its operating advantages, and the specific objects attained by its uses, reference should be made to the accompanying drawings and detailed description in which there are illustrated and described exemplary embodiments of the present disclosure.

DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

Figure 1:
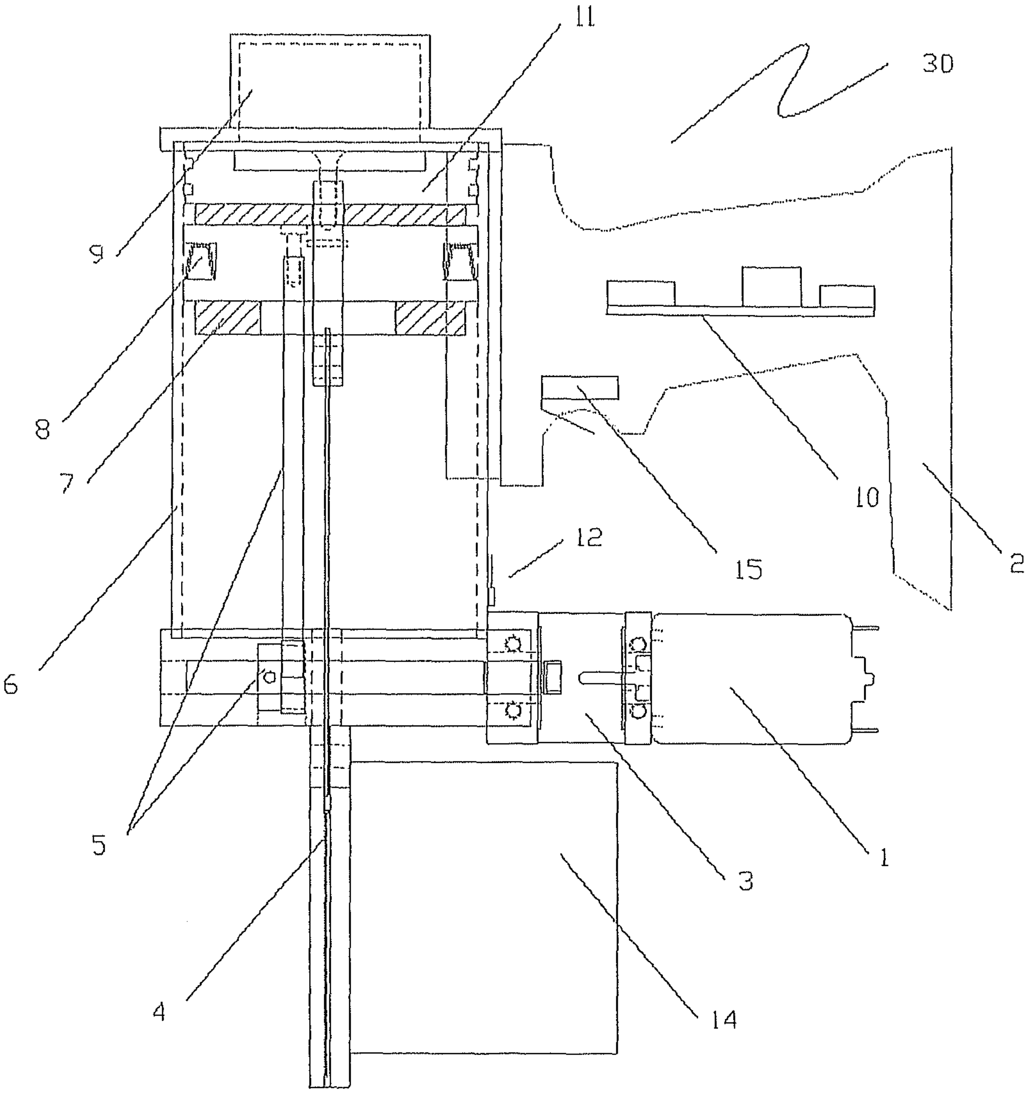
FIG. 1 shows a cutaway view of a fastener driving apparatus, in accordance with an exemplary embodiment of the present disclosure.
Figure 2:
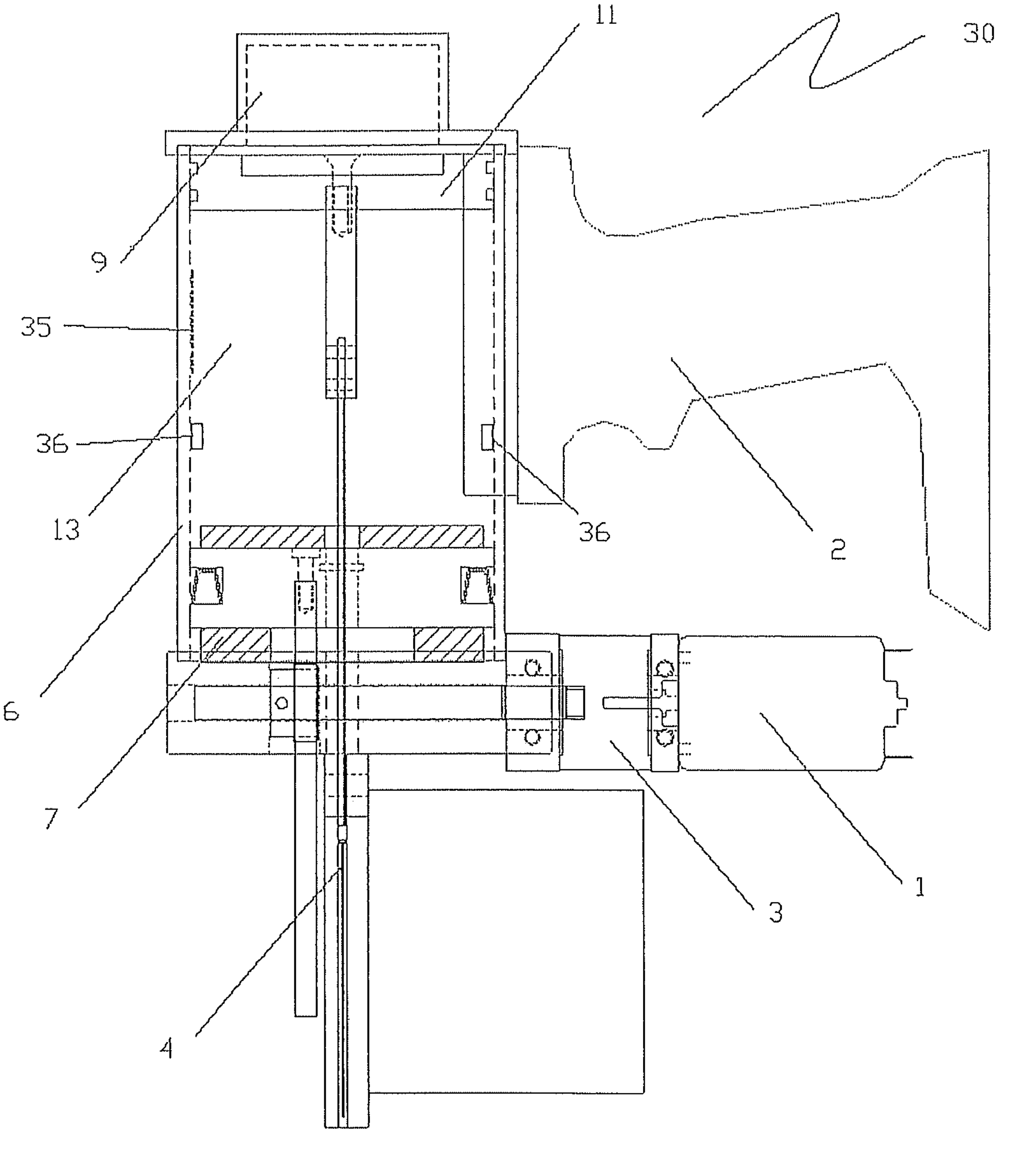
FIG. 2 shows a cutaway view of a fastener driving apparatus showing the vacuum piston in a down position with the vacuum chamber being created in accordance with an exemplary embodiment of the present disclosure.
Figure 3:
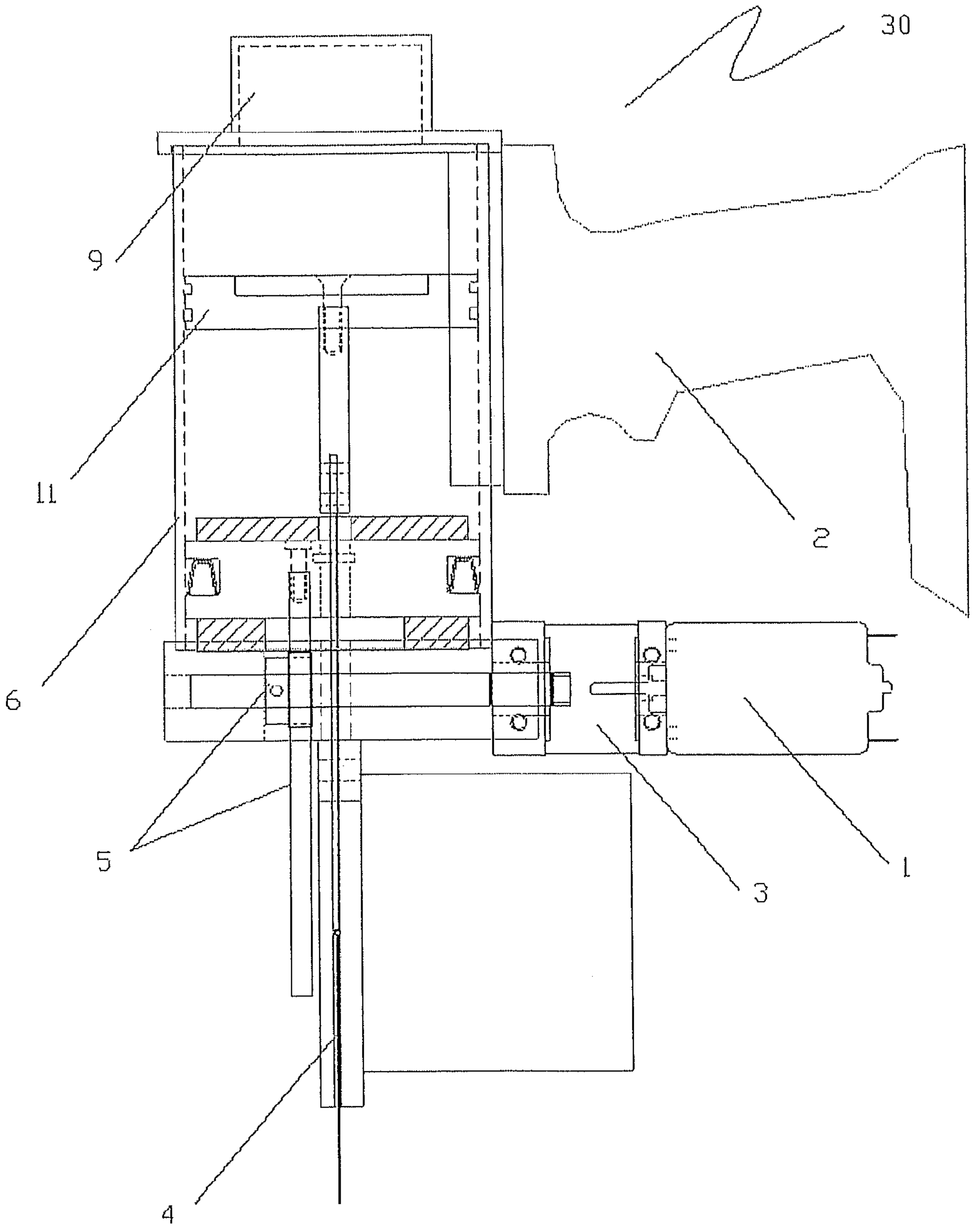
FIG. 3 shows a cutaway view of a fastener driving apparatus showing the drive piston and anvil being mechanically released and the fastener being driven into the substrate in accordance with an exemplary embodiment of the present disclosure.
Figure 4:
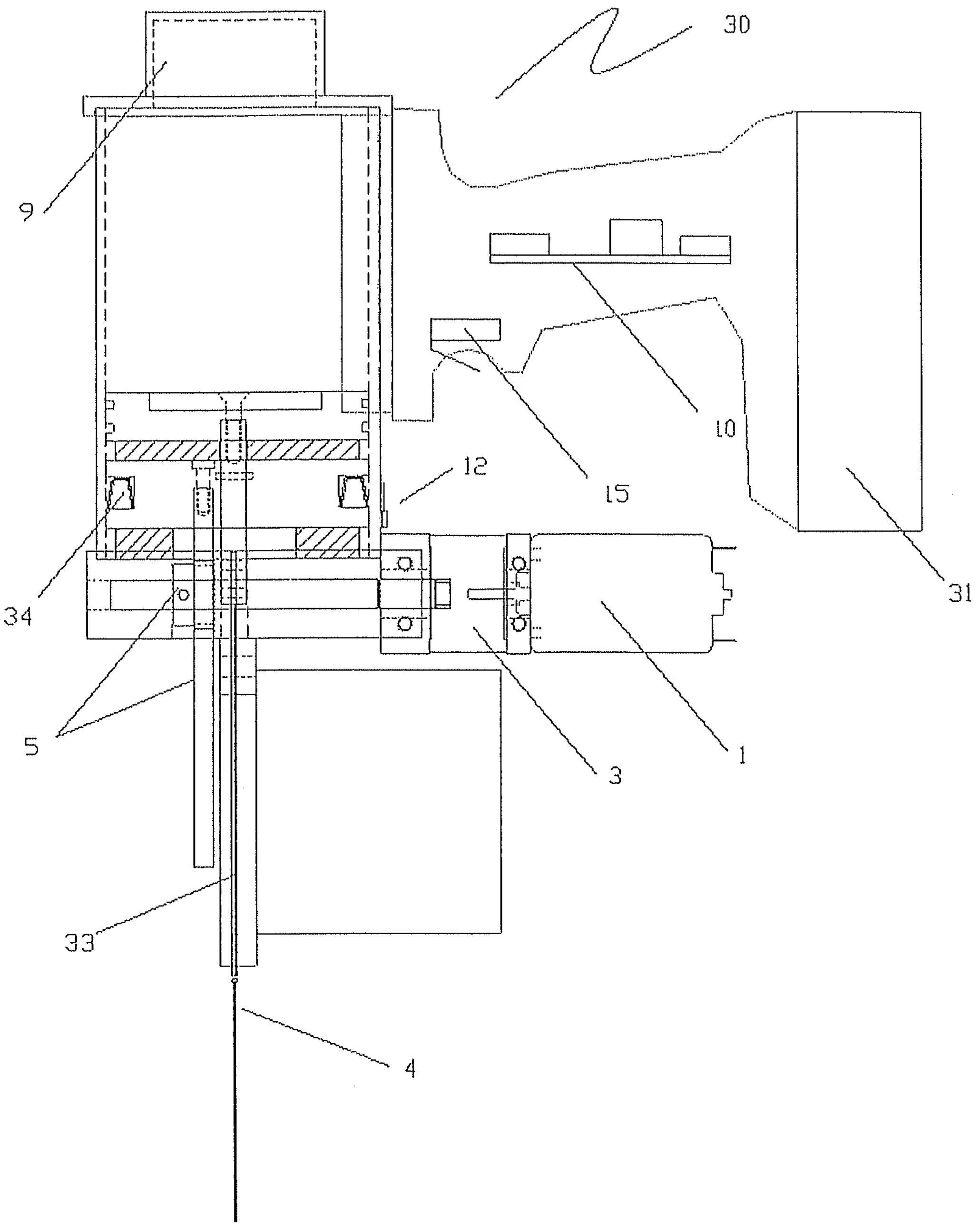
FIG. 4 shows a cutaway view of a fastener driving apparatus, in accordance with an exemplary embodiment of the present disclosure showing the fastener fully driven.
Figure 5:
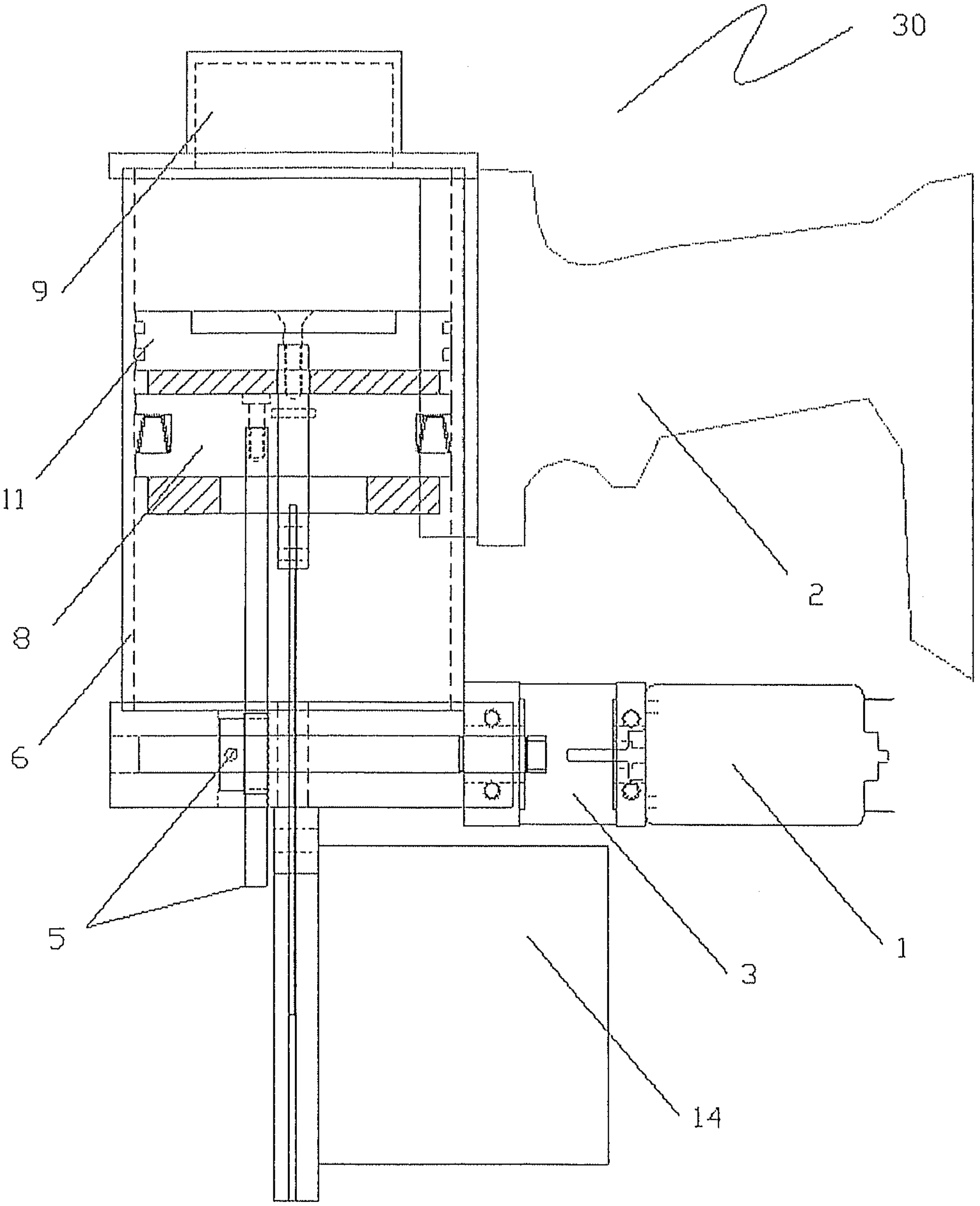
FIG. 5 shows a cutaway view of a fastener driving apparatus, in accordance with an exemplary embodiment of the present disclosure showing the vacuum piston returning to a top dead center position and contacting the drive piston and moving it to the top dead center position as well.

The best mode for carrying out the present disclosure is presented in terms of its preferred embodiment, herein depicted in the accompanying figures. The preferred embodiments described herein detail for illustrative purposes are subject to many variations. It is understood that various omissions and substitutions of equivalents are contemplated as circumstances may suggest or render expedient, but are intended to cover the application or implementation without departing from the spirit or scope of the present disclosure. Furthermore, although the following relates substantially to one embodiment of the design, it will be understood by those familiar with the art that changes to materials, part descriptions and geometries can be made without departing from the spirit of the invention. It is further understood that references such as front, back or top dead center, bottom dead center do not refer to exact positions but approximate positions as understood in the context of the geometry in the attached figures. Furthermore, it should be understood that the term "cylinder" as used refers to a guiding surface or structure and can be any closed surface, including circular, elliptical and filleted configuration.

The terms "a" and "an" herein do not denote a limitation of quantity, but rather denote the presence of at least one of the referenced items.

The present disclosure provides for a fastener driving apparatus. In an embodiment, the apparatus comprises a power source, a control circuit, a motor, a vacuum piston, a linear motion converter, a drive piston, an anvil, a retention means, and a cylinder and/or chamber. In an embodiment, the apparatus also comprises a chamber in which a vacuum may be formed and/or expanded. The power source provides power to the control circuit and to the motor, which motor is responsive to the control circuit. The linear motion converter is coupled to the motor and to the vacuum piston, and uses the motion generated by the motor to actuate the vacuum piston. The vacuum piston and the drive piston are each disposed within the cylinder. The drive piston is held in place by the retention means, and the anvil is coupled to the drive piston. The vacuum piston is capable of generating a vacuum within the cylinder or chamber or creating a vacuum chamber, which vacuum, upon reaching a particular volume, may cause the drive piston to be released from the retention means such that the anvil is capable of driving a fastener into a substrate. As used herein, vacuum refers to achieving an absolute pressure of less than 3 psi during at least one point in in the formation, expansion or creation of the vacuum chamber prior to the release of the drive piston. In another embodiment, the drive piston may be released from the retention means independently from the vacuum that has been generated in the cylinder or chamber (such as by deactivating an electromagnet, where the electromagnet is the retention means). The apparatus may additionally comprise at least one sensor for detecting a position of each of the vacuum piston and the drive piston and directing the control circuit to accordingly activate or deactivate the motor or power source based on such positioning.

The apparatus may further comprise a vent means, at least one valve, at least one bumper, at least one intermediate stoppage point for the vacuum piston, at least one low parasitic loss seal at least one drive piston assist spring and a mechanical element. The vent means vents any air in excess of a certain threshold amount that becomes trapped between the vacuum piston and the drive piston. In an embodiment, the threshold amount comprises anything in excess of three percent of the maximum volume of the vacuum, however, it will be apparent that the threshold amount may be a different amount and is otherwise not limited to the particular value recited herein. The at least one valve may be any of a leak valve, a check valve, and a flow valve, and is preferably disposed on at least one of the vacuum piston and the cylinder. The at least one bumper is disposed between the vacuum piston and the drive piston, absorbs any energy remaining within the drive piston, cylinder or chamber after the anvil drives the fastener, and may prevent damage to the vacuum piston and drive piston that may otherwise result from such components coming into contact with one another. The at least one intermediate stoppage point for the vacuum piston can be used to allow the system to stop mid cycle and reduce the latency time. The latency is defined herein to be the time between the user-controlled event which is to drive a fastener (such as the user pressing a trigger, or a contact trip in the case of a bump fire) and the actual driving of the fastener. The at least one low parasitic loss seal may be at least one seal in the drive piston that has low leakage and a low drag force loss against the cylinder. Low leakage is defined herein as less than 5% of the maximum vacuum volume during the vacuum stroke and a low drag force loss is defined as less than 40% of the vacuum force acting on the drive piston at the start of the drive stroke. In another embodiment, the at least one low parasitic loss seal may be a seal that is attached to the vacuum piston and at least one of the anvil or drive piston. The at least one drive piston assist spring (shown in FIG. 6 as element 39) is either a mechanical or pneumatic assist spring which acts in cooperation with the vacuum to increase the total energy in the drive piston. The mechanical element is a device such as a lost motion coupling, sear or trip lever, which releases the drive piston from the retention means based on the positioning of the vacuum piston.

During a drive cycle, the linear motion converter converts the rotational motion of the motor into linear motion, which linear motion is used to actuate the vacuum piston. Once actuated, the vacuum piston moves from a first position to a second position in order to generate a vacuum within the cylinder in which the vacuum piston is situated. The drive piston, which is retained in the first position by the retention means, remains in the first position until the vacuum generated by the vacuum piston has reached a sufficient volume, at which point the drive piston can be released from the retention means. (It will be apparent that the drive piston may be released from the retention means mechanically through a trip lever, sear or lost motion coupling, or electrically by deactivating an electromagnet, where the electromagnet is the retention means or activating or deactivating a solenoid where a solenoid is part of the retention means. It will be further apparent that the retention means does not have to act directly on the drive piston in order to retain it in a first position. For example in the case that the drive piston is coupled to an anvil, the drive piston may be retained by retention means acting on the anvil.) The drive piston uses the force of the vacuum to move from the first position to the second position, which accordingly causes the anvil to move from and to the same. As the anvil moves from a first position to a second position, it will come into contact with the head of a fastener and will transfer the energy of the vacuum to such fastener in order to drive it into the substrate. In an embodiment, the linear motion converter may thereafter actuate the vacuum piston in order to move the vacuum piston from the second position to the first position, which movement thereof may resultingly cause the drive piston to similarly return to the first position. This would have the effect of returning the various components of the apparatus to their initial positions such that the drive cycle may be operatively repeated.

Referring now to FIGS. 1 through 5, and in an exemplary embodiment, the drive cycle of the fastener driving apparatus 30 is initiated by the user pressing a trigger switch 15 that causes power to be directed from the power source 31 to the motor 1 through the control circuit 10. The user will preferably hold the apparatus 30 by the hand grip 2 in order to avoid safety issues during operation. The control circuit 10 may be any device capable of transmitting power to the motor 1 for the purpose of initiating a drive cycle and then removing the power to the motor 1 after the drive cycle has substantially completed. Directing power to the motor 1 causes it to turn, transferring energy through the rotating elements thereof and into the linear motion converter 5. The linear motion converter 5 is operatively coupled to the motor 1 and to the vacuum piston 8, and may be any mechanism capable of converting the rotational motion of the motor 1 into a linear motion for use with the vacuum piston 8. In an embodiment, the linear motion converter 5 comprises one of a slider crank, rack and pinion, friction drive, belt drive, screw drive, and cable drive, with the preferred embodiment being a rack and pinion. A gear reducer 3 is included, which reduces the speed of the rotational motion outputted by the motor 1 to a speed at which the linear motion converter 5 may operate. In one embodiment, a clutch may be included as one of the elements of the linear motion converter. In such an embodiment, the clutch may be used to actively engage and disengage the motor from the linear motion converter, thus reducing the latency in the fastener driving device.

The linear motion converter 5 moves the vacuum piston 8 away from the drive piston 11, thereby resulting in a vacuum being generated within the cylinder 6 or the chamber 13, which chamber 13 may, in an embodiment, be disposed between the vacuum piston 8 and the drive piston 11 within cylinder 6. The motor 1 may thereafter continue to rotate, which rotation further moves the vacuum piston 8 until, in an embodiment, it is approximately at a bottom dead center position (hereinafter referred to as "BDC") within the cylinder 6 and the chamber 13 is at or near its maximum size. Once this occurs, the vacuum within the cylinder or within the chamber 13 will be at or near its maximum volume. In an embodiment, the chamber 13 is defined by a face of the vacuum piston 8, a face of the drive piston 11, and the cylinder 6, itself. It will be apparent that other configurations of the chamber 13 are also possible. The chamber 13 has a maximum volume that is proportional to the amount of work to be done. For example, where the fastener to be driven is an *8d* gauge fastener, the volume of the chamber 13 ranges from about 30 to 70 $in^3$, and more preferably is 50 $in^3$.

The drive piston 11 is held in place by a retention means 9 until the vacuum has reached a particular volume, or after the retention means 9 ceases applying a retention force on the drive piston 11, or when another force acts to overcome the retention force (such as an exemplary embodiment whereby the anvil further comprises a pin or other contact point that may be contacted by the vacuum piston 8 near BDC of the vacuum piston). In an embodiment, the retention means 9 is at least one of a magnet, electromagnet, solenoid, mechanical means (including, for example, detents and levers), pneumatic valve, mechanical restraint, and friction fit. In an embodiment wherein the retention means 9 is a magnet, the drive piston 11 may include a ferrous element that allows the drive piston 11 to be retained by a magnet force, and, for the release, the magnetic force from retention means 9 is overcome by a force from the vacuum piston 8. In an embodiment where the drive piston is coupled to another element such as an anvil, the retention means can act on the anvil, for example, in order to retain the drive piston. In an embodiment wherein the retention means 9 is a pneumatic valve, the retention means 9 may consist of a hole through the drive piston 11 and a valve that seals off the air above the drive piston 11, which hole in the drive piston 11 allows the pressure to balance across the drive piston 11. A small magnet may also be used for additional retention of the drive piston 11. When the vacuum piston 8 is at BDC and ready to release, a valve above the drive piston 11 can be opened. This allows atmospheric pressure to push the drive piston 11 downward as air rushes into the valve above the drive piston 11.

In an embodiment, the retention means 9 may retain the drive piston 11 in the first position until the vacuum in the cylinder 6 or chamber 13 reaches a particular volume. In a preferred embodiment a timed dwell in the linear motion converter occurs in one or more of the ends of the vacuum piston stroke. A timed dwell at or near BDC allows for the drive piston to finish the fastener drive stroke without impacting the vacuum piston on its return stroke. A timed dwell at or near a top dead center position (hereinafter referred to as "TDC") allows time for excess air which has leaked or been trapped between the vacuum piston and the drive piston to be purged out of the system. The preferred time of these timed dwells is at least 5 milliseconds and more preferably 25 milliseconds.

The drive piston 11 is operatively coupled to an anvil 33, which anvil 33 comes into contact with and drives the fastener 4. As stated above, once the vacuum in the cylinder 6 or chamber 13 has reached a particular volume, the retention means 9 is released or overcome, which release applies the force of the vacuum onto the drive piston 11 such that the drive piston 11 and anvil 33 are moved downward towards BDC. This movement results in the anvil 33 coming into contact with the head of the fastener 4, thus transmitting the energy of the vacuum to the fastener 4, thereby causing it to be driven into the substrate. In an embodiment, and once the fastener 4 is driven, a new fastener 4 may be loaded into the apparatus 30 from an attached nail magazine 14.

For instance, the result of such a design is that a standard 8 gauge 2.5" long fastener may be fully driven into a pine substrate where the volume of the chamber 13 is approximately 50 $in^3$ and the vacuum is at a level of approximately 2 psia (or more preferably less than 0.5 psia.)

It was discovered that because of the characteristics of the load, a more constant force results in the drive cycle by using a vacuum rather than the inventors' prior concept of a compressed air application. This unexpectedly increases the efficiency of the fastener driving (as measured by energy consumed per fastener driven) by more than 50%. Additionally, the maximum torque needed from the motor 1 is resultingly decreased by more than 50%, which allows for the use of lower cost components and a lower gear ratio. Furthermore, the disclosure as taught eliminates and obviates a valve for reducing air flow losses, which further decreases cost.

It should be noted that the drive piston 11 and anvil 33 assembly that drives the fastener 4 into the substrate does not compress any type of anvil return spring during the drive cycle. While it was expected that this would result in an improvement to the apparatus 30, the degree of improvement was unexpected. Heretofore in the prior art, the air spring and mechanical spring designs would bias the anvil away from the substrate and rob energy during the drive cycle. The improvement herein not only results from no loss of force during the drive cycle, but also from an increased drive speed, as no return spring or bungee is coupled to the drive piston 11. Furthermore, the absence of a return spring simplifies jam recovery in that if the anvil 33 jams during a down stroke of the drive cycle, the return stroke of the vacuum piston 8 retracts the anvil 33 and clears the jam. This automatically resets the timing and readies the device for the next drive cycle.

In a preferred embodiment, the drive cycle is followed by a return cycle, which involves the vacuum piston 8 moving from BDC and beginning its upward stroke. The upward stroke may be initiated by reversing the direction of the motor 1, which, in a preferred embodiment, is accomplished via a rack and pinion linear motion converter 5. In a further embodiment, the motor is a brushless motor, which minimizes the energy which is lost in motor reversal by limiting the energy stored in the rotor inertia. This upward stroke causes the vacuum piston 8 to come into contact with the drive piston 11 and effectively returns the drive piston 11 back to its exemplary starting position at or near a TDC position where the drive piston 11 can be retained by the retention means 9 and prepare for another drive cycle.

Once the return cycle has completed, the operation of the apparatus 30 may be halted, and the power source 31 may be operatively disconnected from the control circuit 10 and/or the motor 1 dynamically braked. At this point, the apparatus 30 is ready to repeat the drive cycle. In a preferred embodiment, a sensor 12 is used to determine when the drive piston 11 is at or near TDC to allow for the drive cycle to be repeated. Although the vacuum piston 8 is not similarly required to return to TDC, the vacuum piston 8 may preferably stop movement approximately between BDC and TDC in order to prepare for the next drive cycle. In the embodiment wherein the apparatus 30 comprises a sensor 12, the sensor 12 may be further used to determine when the vacuum piston 8 has reached a particular position. In an embodiment, the remainder of the movement of the vacuum piston 8 towards TDC may occur at the initiation of the next drive cycle.

As discussed above, a vent means 35 may be disposed between the drive piston 11 and vacuum piston 8, and at least one valve 36 may be disposed on either or both of the cylinder 6 and the vacuum piston 8. The vent means 35 vents any air in excess of a threshold amount that may become trapped between the vacuum piston 8 and drive piston 11. It will be apparent that the at least one valve 36 may be one or more of a check valve, a leak valve, and a flow valve. Additionally, and in a further embodiment, a check valve may be used, which check valve is preferably disposed in the vacuum piston 8. The check valve may reduce the buildup of air in the cylinder 6 or chamber 13 and allow any air trapped between the vacuum piston 8 and the drive piston 11 to be purged out as the vacuum piston 8 approaches the drive piston 11 at TDC.

The check valve and seal 34 help to facilitate the creation of the maximum vacuum during the movement of the vacuum piston 8 from TDC to BDC and thus to ensure that a sufficient force is used to drive the fastener 4 into the substrate.

In another embodiment, a flow valve may be included, which provides for an adjustment of the flow of air to the atmospheric side of the drive piston 11. In this way, the flow valve allows for the regulation of force of the vacuum during the drive cycle. The apparatus 30 may include one or more of any of the above-mentioned valves and seals.

In another embodiment, the apparatus 30 further comprises a bumper 7 disposed between the vacuum piston 8 and the drive piston 11. The bumper 7 absorbs any force from the vacuum remaining after the completion of the drive cycle or the return cycle, thereby preventing that remaining force from being transmitted to another component of the apparatus 30. Namely, the bumper 7 prevents the remaining force from causing the vacuum piston 8 and the drive piston 11 to damagingly contact one another. In an embodiment, more than one bumper 7 may be used as described for added force absorption and protection of the various components.

Figure 6:
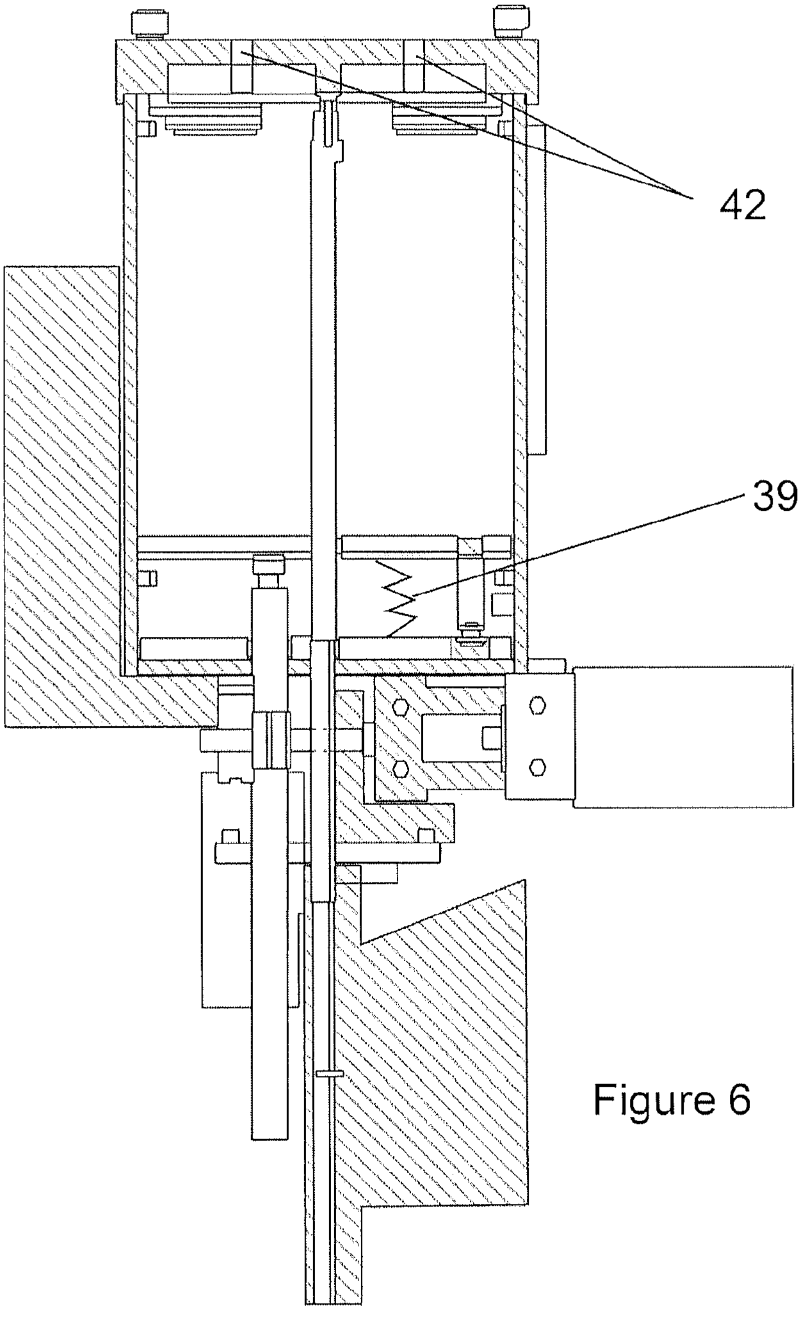
FIG. 6 shows a cutaway view of a fastener driving apparatus, in accordance with an alternate exemplary embodiment of the present disclosure showing an extensible spring in addition to the vacuum for driving the fastener.

Referring now to FIG. 6, and in a preferred embodiment, a spring assist is used in conjunction with a vacuum to increase the energy of the drive piston. The spring assist is shown in an exemplary embodiment as a mechanical spring, however, it is should be apparent that the spring assist may comprise an air spring a mechanical spring, or an extensible elastomeric spring, which spring assist preferably is operatively disposed between the vacuum piston and the drive piston. The addition of a spring assist is to increase the energy available to the drive piston with only a small increase in the tool size.

Figure 7:
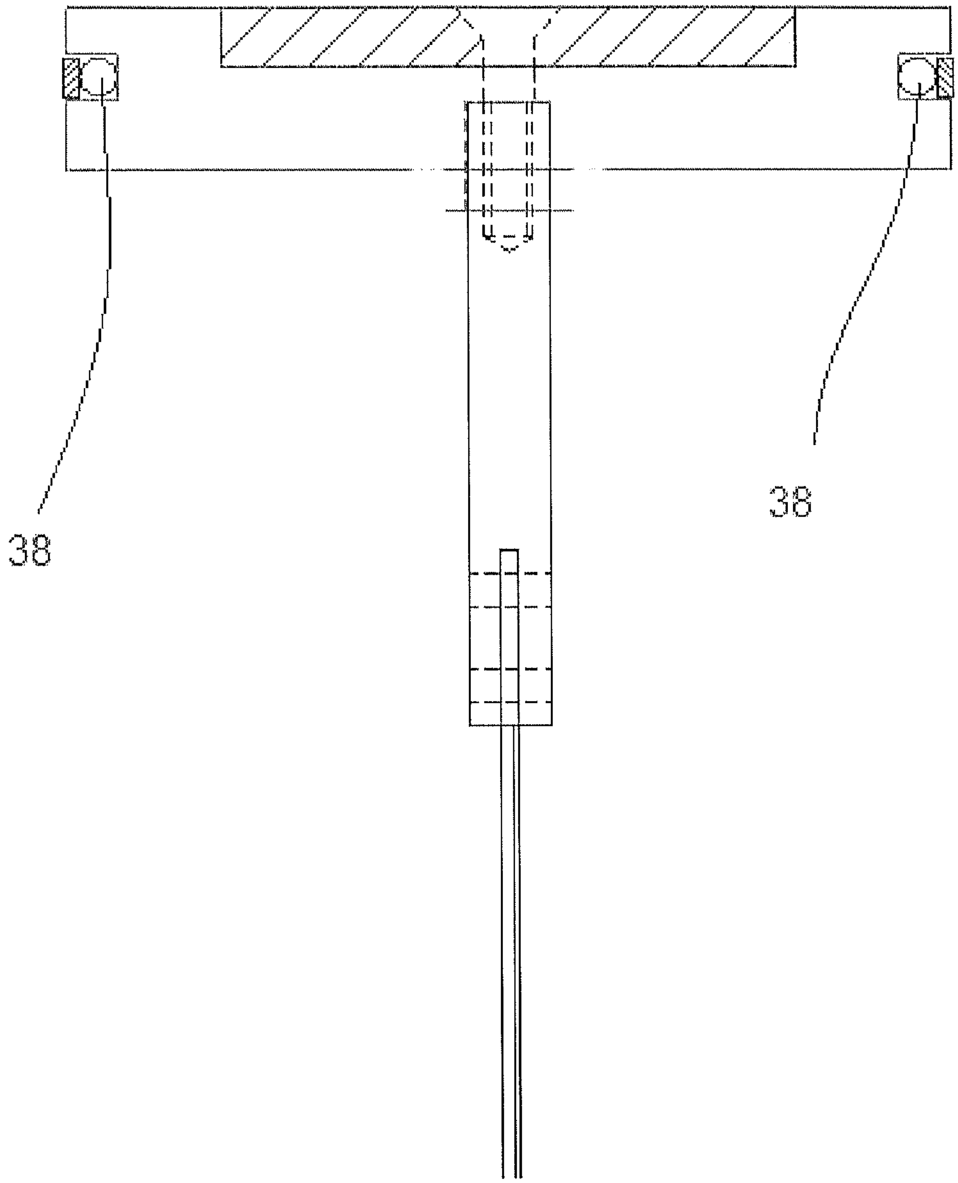
FIG. 7 shows a cutaway view of the drive piston showing low parasitic loss sealing elements, in accordance with an exemplary embodiment of the present disclosure.
Figure 9:
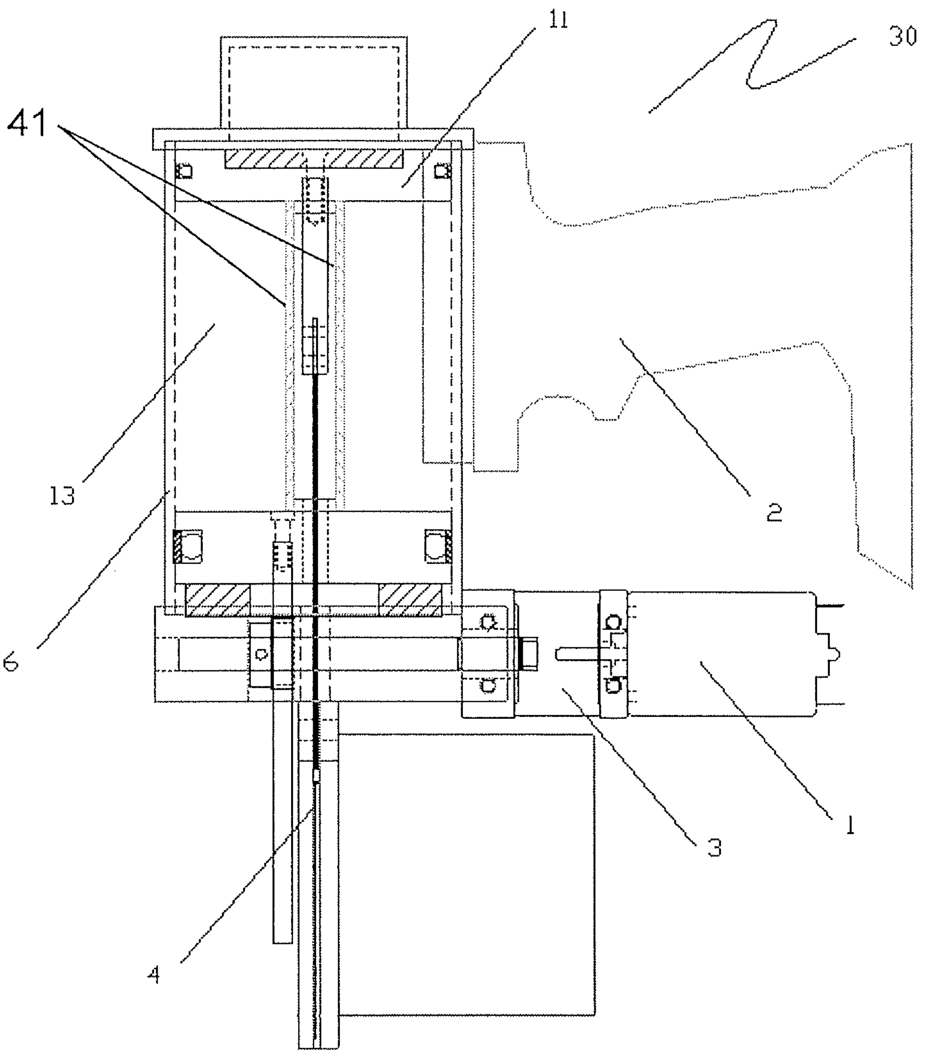
FIG. 9 shows a cutaway view showing a low friction seal around the anvil comprising an extensible seal, in accordance with an exemplary embodiment of the present disclosure.

Referring now to FIGS. 7 and 9 and in a preferred embodiment one or more of the seals used in the drive piston, anvil, and or vacuum piston results in low parasitic loss of drive energy. It was determined in the development of the present disclosure that the energy in a perfect vacuum at sea level is approximately 14.7 inch lbs per cubic inch of vacuum. It was discovered that the energy delivered in prior art tools was only about 8 inch lbs per cubic inch of vacuum. The losses were determined to be one of either seal leakage (resulting in less than optimum vacuum) and/or drag losses during the drive cycle. Through development, it was determined that the drag losses were a function of the interface pressure and the coefficient of friction between the drive piston seal and the cylinder. A set of tests showed that a low parasitic loss seal design is given by the combination of a seal leakage of less than 10% of the total vacuum during the period in which the vacuum is driven and drag force that is less than 30% of the total force exerted by the vacuum on the drive piston. One such seal design 38 is shown in FIG. 7 uses a composite Teflon graphite seal, which seal is activated by a rubber loader ring. The typical dynamic coefficient of friction in such a design is less than 0.3. The rubber loader ring ensures that a low but consistent sealing force is exerted between the drive piston and the cylinder wall and gives long life.

In another embodiment shown in FIG. 9, the low parasitic lost seal comprises a tubular structure 41 or other device that is connected to the drive piston and the vacuum piston, which tubular structure encloses at least a portion of the anvil. The tubular structure is comprised of material that allows the drive cycle operation of the vacuum piston and drive piston described above, while still maintaining a seal around at least a portion of the anvil. In an exemplary embodiment, the tubular structure comprises a latex, silicone or nitrile material, which material is substantially elastic and allows the tubular structure to stretch during the operational cycle, while still maintaining a seal around the anvil. In another embodiment, the tubular structure comprises a bellows, which bellows is capable of lengthening and compressing. In yet another embodiment, the tubular structure comprises a rolling diaphragm configuration, which configuration allows the structure to compress and lengthen during the operational cycle.

The tubular structure provides a seal around the anvil without reducing the volume of the vacuum created in the operational cycle, The tubular structure minimizes parasitic loss of the drive energy during the operational cycle, thereby increasing the efficiency of the fastener driving apparatus.

Figure 8:
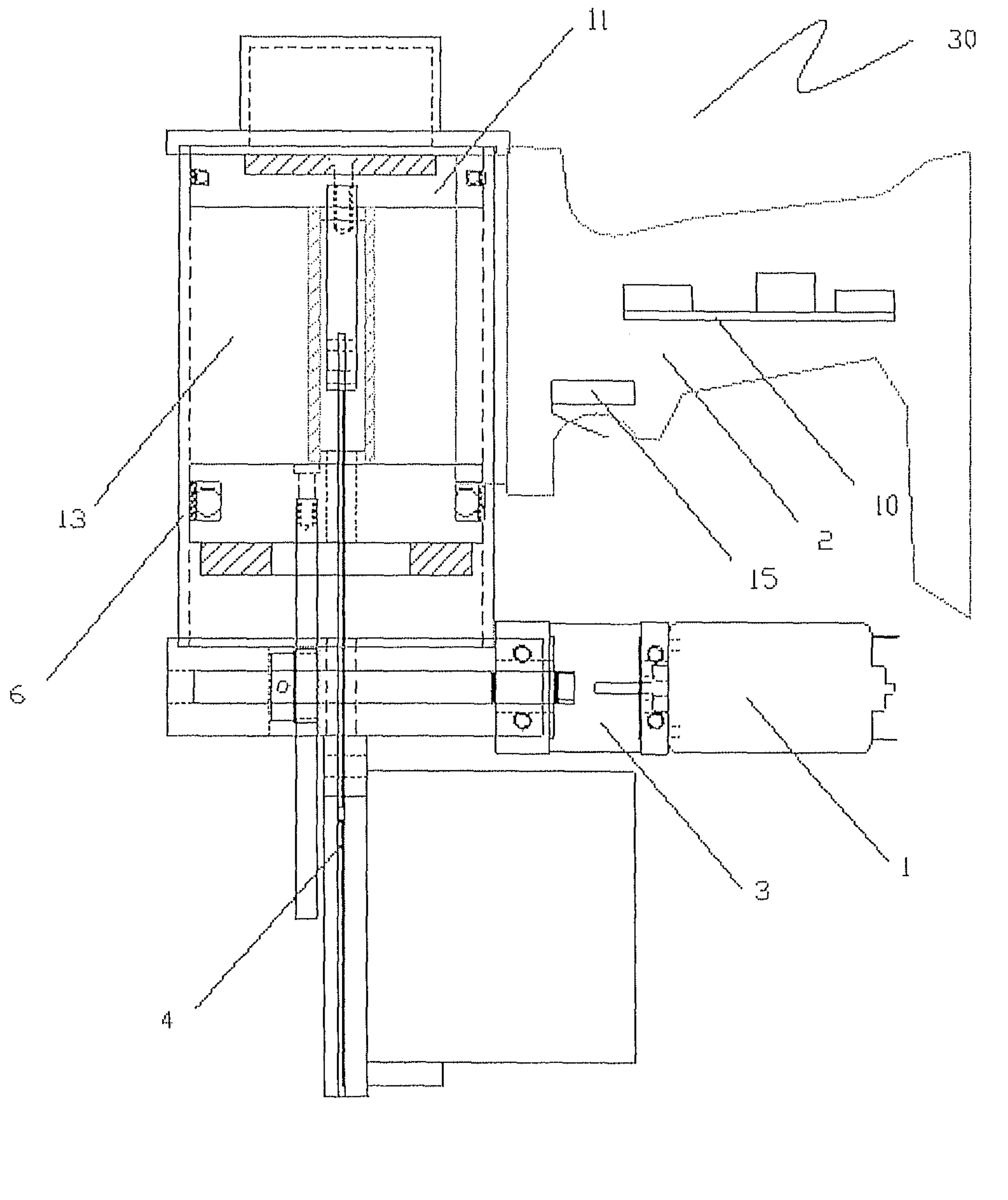
FIG. 8 shows a cutaway view showing a partial stroke of the vacuum piston where it is locked into a position and permits a shortened latency for the fastener driving apparatus, in accordance with an exemplary embodiment of the present disclosure.

Referring now to FIG. 8 and in a further embodiment an intermediate stopping point is used in the fastener driving apparatus. This preferred embodiment stops and holds the vacuum piston at an intermediate point that corresponds preferably at least 50% of the cycle stroke. The purpose of such an intermediate stopping point is to allow reduction in the system latency by reducing the total stroke to fire by at least 50% and more preferably 80%. In FIG. 8, and in an embodiment, the intermediate stopping point is accomplished with the vacuum piston being held in position by locking the linear motion converter. This can be accomplished by the motor or more preferably through the use of a pawl on one of the gears. One exemplary operation in this embodiment is in a standard bump fire in which the operator may press a trigger or other switch to cause the vacuum piston to come to the intermediate point and stop. As the operator uses the contact trip 40 to "bump" and engage bump fire, the vacuum piston and drive piston complete the normal stroke thus reducing the latency in the fastener driving mechanism by at least 50%, and more preferably, by 80%.

In a further embodiment, one or more fault conditions may be detectable by the control circuit 10 and/or sensors 12. Where one or more of the control circuit 10 and/or sensors 12 have failed, the apparatus 30 may be safely shut down and operation thereof may be inhibited until the detected fault is corrected. A fault condition is defined as any condition in which the apparatus 30 could operate without all safety conditions being met. The safety conditions may include the contact trip on the foot of the apparatus 30 as well as the trigger switch for cycle initiation.

Although the aforementioned elements are used in the preferred design, it is understood by those familiar with the an that considerable simplification is possible without departing from the spirit of the invention. It is further understood by those skilled in the art that the sensors 12 can be used in conjunction with other elements of the control circuit 10 to allow location at different places, and that sensors 12 can be of many forms including, but not limited to, limit switches, Hall effect sensors, photo sensors, reed switches, timers, and current or voltage sensors, without departing from the spirit of disclosure. Further, preferred embodiments of the control circuit 10 include, but are not limited to, low battery indication, pulse-width modulation control of motor, status display, and sequential or bump fire.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the disclosure and various embodiments with various modifications as are suited to the particular use contemplated.

What is claimed is:

1. A fastener driving apparatus for driving a fastener into a substrate, the apparatus comprising:

a power source;

a control circuit, said control circuit operatively coupled to said power source;

a motor, said motor operatively coupled to said power source, said motor responsive to said control circuit;

a vacuum piston;

a linear motion converter, said linear motion converter operatively coupled to said motor, said linear motion converter operatively coupled to said vacuum piston;

a drive piston;

an anvil, said anvil operatively coupled to said drive piston;

at least one seal operatively coupled to at least one of said vacuum piston, said drive piston and said anvil, said at least one seal capable of reducing a parasitic loss of at least one of said vacuum piston, said drive piston and said anvil during operation of the fastener driving apparatus;

a retention means, said retention means retaining said drive piston in a first position until a sufficient force is applied against said retention means or until a retention force of said retention means is released; and a cylinder, said vacuum piston capable of reciprocally moving within said cylinder, said drive piston capable of reciprocally moving within said cylinder, wherein during a drive cycle said linear motion converter actuates said vacuum piston such that a vacuum is generated, which vacuum is applied on said drive piston, and when said vacuum reaches a sufficient volume, said retention means releases said drive piston and wherein said drive piston moves from a first position to a second position such that said anvil is capable of driving a fastener into a substrate.

2. The apparatus as claimed in claim 1, wherein the parasitic loss of said drive piston due to friction is reduced to less than 30% of theoretical energy by reducing one of a sealing force and a coefficient of friction.

3. The apparatus as claimed in claim 1, wherein said retention means comprises at least one of a magnet, electromagnet, solenoid, mechanical means, pneumatic valve, mechanical restraint, and friction fit.

4. The apparatus as claimed in claim 1, wherein said apparatus further comprises a vent means, said vent means capable of venting any air in excess of a threshold amount trapped between said vacuum piston and said drive piston.

5. The apparatus as claimed in claim 1, wherein said apparatus further comprises at least one bumper disposed between said drive piston and said vacuum piston.

6. The apparatus as claimed in claim 1, wherein said coupling of said motor and said linear motion converter comprises one of a clutch and a planetary gearbox.

7. The apparatus as claimed in claim 1, wherein during the drive cycle said vacuum piston stops at an intermediate stoppage point prior to the release of said drive piston.

8. The apparatus as claimed in claim 1, wherein said at least one seal comprises an elastomeric tubular structure.

9. The apparatus as claimed in claim 1, wherein an air adjustment means is used to restrict air at a backside of said drive piston such that a drive piston energy can be adjusted by at least 15%.

10. A fastener driving apparatus for driving a fastener into a substrate, the apparatus comprising:

a power source;

a control circuit, said control circuit operatively coupled to said power source;

a motor, said motor operatively coupled to said power source, said motor responsive to said control circuit;

a vacuum piston;

a linear motion converter, said linear motion converter operatively coupled to said motor, said linear motion converter operatively coupled to said vacuum piston;

a drive piston;

an anvil, said anvil operatively coupled to said drive piston;

a retention means, said retention means retaining said drive piston in a first position until a sufficient force is applied against said retention means or until a retention force of said retention means is released; and a cylinder, said vacuum piston capable of reciprocally moving within said cylinder, said drive piston capable of reciprocally moving within said cylinder, wherein during a drive cycle said linear motion converter actuates said vacuum piston such that a vacuum is generated, which vacuum is applied on said drive piston, and when said vacuum reaches a sufficient volume, said retention means releases said drive piston and wherein said drive piston moves from a first position to a second position such that said anvil is capable of driving a fastener into a substrate, and wherein during the movement of said drive piston from the first position to the second position thereof, said vacuum piston is held proximate to a point of retention release for a timed dwell.

11. The apparatus as claimed in claim 10, wherein during the drive cycle said timed dwell at either end of a path of movement of said vacuum piston is at least 0.02 seconds.

12. The apparatus as claimed in claim 10, wherein said retention means comprises at least one of a magnet, electromagnet, solenoid, mechanical means, pneumatic valve, mechanical restraint, and friction fit.

13. The apparatus as claimed in claim 10, wherein said apparatus further comprises a vent means, said vent means capable of venting any air in excess of a threshold amount trapped between said vacuum piston and said drive piston.

14. The apparatus as claimed in claim 10, wherein said apparatus further comprises a spring assist operatively disposed between said vacuum piston and said drive piston to increase the energy applied on said drive piston.

15. The apparatus as claimed in claim 14, wherein said spring assist is one of an elastomeric spring, mechanical spring or air spring.

16. The apparatus as claimed in claim 10, wherein said coupling of said motor and said linear motion converter comprises one of a clutch and a planetary gearbox.

17. The apparatus as claimed in claim 10, wherein said apparatus further comprises a mechanical element, which mechanical element is capable of releasing said drive piston from said retention means based on a position of said vacuum piston in said cylinder.

18. A fastener driving apparatus for driving a fastener into a substrate, the apparatus comprising:

a power source;

a control circuit, said control circuit operatively coupled to said power source;

a motor, said motor operatively coupled to said power source, said motor responsive to said control circuit;

a vacuum piston;

a linear motion converter, said linear motion converter operatively coupled to said motor, said linear motion converter operatively coupled to said vacuum piston;

a drive piston;

an anvil, said anvil operatively coupled to said drive piston;

a chamber, said chamber being formed or expanded and capable of receiving a vacuum therein;

a drive piston assist spring;

a retention means, said retention means retaining said drive piston in a first position until a sufficient force is applied against said retention means or until a retention force of said retention means is released; and a cylinder, said vacuum piston capable of reciprocally moving within said cylinder, said drive piston capable of reciprocally moving within said cylinder, wherein during a drive cycle said linear motion converter actuates said vacuum piston such that a vacuum is generated in the chamber, and such that said drive piston assist spring is energized, which vacuum and drive piston assist spring is applied on said drive piston, and when said vacuum reaches a sufficient volume, said retention means releases said drive piston and wherein said drive piston moves from a first position to a second position such that said anvil is capable of driving a fastener into a substrate, and wherein during a return cycle said drive piston is moved from the second position to the first position such that the apparatus is thereafter capable of repeating the drive cycle.

19. The apparatus as claimed in claim 18, wherein said control circuit precludes the further operation of the apparatus upon the detection of a fault condition until the fault condition has been resolved.

20. The apparatus as claimed in claim 18, wherein said retention means comprises at least one of a magnet, electromagnet, solenoid, mechanical means, pneumatic valve, mechanical restraint, and friction fit.

* * * * *